(12) United States Patent
Vick, Jr.

(10) Patent No.: US 11,746,936 B2
(45) Date of Patent: Sep. 5, 2023

(54) THREADED JOINT FOR COUPLING TWO CONCENTRIC TUBES TO ONE TUBE

(71) Applicant: Halliburton Energy Services, Inc., Houston, TX (US)

(72) Inventor: James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 388 days.

(21) Appl. No.: 16/481,129

(22) PCT Filed: Dec. 28, 2018

(86) PCT No.: PCT/US2018/067963
§ 371 (c)(1),
(2) Date: Jul. 26, 2019

(87) PCT Pub. No.: WO2020/139383
PCT Pub. Date: Jul. 2, 2020

(65) Prior Publication Data
US 2021/0215280 A1      Jul. 15, 2021

(51) Int. Cl.
*F16L 15/00*       (2006.01)
*E21B 17/042*   (2006.01)

(52) U.S. Cl.
CPC ........... *F16L 15/007* (2013.01); *F16L 15/009* (2013.01); *E21B 17/042* (2013.01)

(58) Field of Classification Search
CPC ...... F16L 15/007; F16L 15/009; E21B 17/042
See application file for complete search history.

(56) References Cited

U.S. PATENT DOCUMENTS

| 3,298,716 A | 1/1967 | Taylor et al. |
| 3,994,516 A | 11/1976 | Fredd |

(Continued)

FOREIGN PATENT DOCUMENTS

| EP | 2372208 B1 | 5/2013 |
| WO | 2005095840 A1 | 10/2005 |

OTHER PUBLICATIONS

PCT Application Serial No. PCT/US2018/067963, International Search Report, dated Sep. 25, 2019, 3 pages.

(Continued)

*Primary Examiner* — James M Hewitt, II
(74) *Attorney, Agent, or Firm* — DELIZIO, PEACOCK, LEWIN, & GUERRA

(57) ABSTRACT

A threaded joint (200) provides for metal-to-metal sealing on the ends of concentrically positioned inner and outer tubes when joining the concentric tubes to a single tube (107). A threaded coupling (105) secures the inner and outer tubes and joins both tubes to a single tube. The threaded connection leverages metal-to-metal sealing on the ends of each tube. The inner tube (102) may differ in length from the outer tube (101) and contains a single thread (211) at its for receiving the threaded coupling. Threading the coupling onto the inner tube establishes four flexing metal-to-metal seals (209A-D) between the threaded joint components. The inner and outer tubes maintain contact at the internal shoulder (104) as a result of preloading. If the tubes are of varying thicknesses, a nut (407) is placed between the internal shoulder and the threaded coupling to preserve contact between the tubes at the internal shoulder.

20 Claims, 5 Drawing Sheets

(56) References Cited

U.S. PATENT DOCUMENTS

| | | | |
|---|---|---|---|
| 4,423,778 A * | 1/1984 | Goldsmith | E21B 17/02 |
| | | | 166/134 |
| 4,662,659 A | 5/1987 | Blose et al. | |
| 4,997,048 A | 3/1991 | Isom | |
| 5,141,261 A | 8/1992 | Ziu | |
| 5,423,575 A * | 6/1995 | Parks | F16L 39/00 |
| | | | 285/123.1 |
| 7,100,946 B2 | 9/2006 | Giacomelli et al. | |
| 7,134,514 B2 | 11/2006 | Riel et al. | |
| 7,152,700 B2 * | 12/2006 | Church | E21B 17/203 |
| | | | 175/320 |
| 8,770,628 B2 | 7/2014 | Alhaug | |
| 8,777,273 B2 | 7/2014 | Syse et al. | |
| 9,470,344 B2 | 10/2016 | Verger et al. | |
| 2005/0212285 A1 | 9/2005 | Haun | |
| 2009/0284004 A1 | 11/2009 | Simmons et al. | |
| 2011/0115218 A1 | 5/2011 | Olivier, III | |
| 2011/0133449 A1 | 6/2011 | Mazzaferro et al. | |
| 2012/0241142 A1 * | 9/2012 | Cook | E21B 29/02 |
| | | | 166/55 |

OTHER PUBLICATIONS

PCT Application Serial No. PCT/US2018/067963, International Written Opinion, dated Sep. 25, 2019, 5 pages.

"SG Application No. 11202101219X International Search Report and Written Opinion", dated Sep. 19, 2022, 10 pages.

* cited by examiner

THREADED JOINT FOR COUPLING TWO CONCENTRIC TUBES TO ONE TUBE

TECHNICAL FIELD

The disclosure generally relates to the field of mechanical engineering, and more particularly to joints or fittings for pipes.

BACKGROUND

To create a chamber between two tubes with differing inner and outer diameters, the tubes are concentrically positioned and sealed. The tubes can be secured and/or sealed through various techniques (e.g., metal-to-metal seals, elastomeric/non-elastomeric seals, threading, etc.). The region within the inner tube may be utilized to contain equipment.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to using a threaded joint to join two concentrically positioned tubes to downhole tubing in illustrative examples. Embodiments of this disclosure can be instead applied to terminal tubular structures adapted for deployment to any environment. In other instances, well-known instruction instances, protocols, structures and techniques have not been shown in detail in order not to obfuscate the description.

Overview

When employing concentric tubing in an apparatus to be connected to downhole tubing, some types of seals will be unable to withstand the high temperatures and/or pressures of the downhole environment (e.g., elastomeric or non-elastomeric seals). A threaded joint has been designed for metal-to-metal joint connections on the ends of the concentrically related inner and outer tubes when joining the tubes to the downhole tubing. The use of metal withstands the hostile aspects of a downhole environment. The threaded joint leverages a threaded coupling for securing the inner and outer tubes and joining both tubes to a single downhole tube as well as metal-to-metal sealing on the ends of each tube. The inner tube is longer in length than the outer tube and contains a single helical thread at its terminal end which extends beyond an internal shoulder for receiving the threaded coupling. Threading a box end of the coupling onto the receiving end of the inner tube establishes four flexing metal-to-metal seals between the joint components (i.e., the inner and outer tubes and the threaded coupling). The inner and outer tubes maintain contact at the internal shoulder as a result of preloading the tubes to control distribution of tension and compression. Preloading the inner and outer tubes to reduce the tension under which the inner tube is placed relative to the outer tube prevents breakages in the tubes which may arise due to imbalances in the maximum forces which the tubes can endure, therefore ensuring the structural integrity of the concentric tubing when applying force to the downhole tubing which has been threaded onto the pin end of the coupling. If the tubes are of varying thicknesses to cause a narrowing of the region between the tubes past the internal shoulder, a nut may be placed between the internal shoulder and the threaded coupling to preserve contact between the tubes at the internal shoulder. Once the threaded joint is formed by securing the threaded coupling to the preloaded tubes and the metal-to-metal sealing surfaces are in contact, the downhole tubing can be joined to the concentrically positioned tubes.

Example Illustrations

Figure 1:
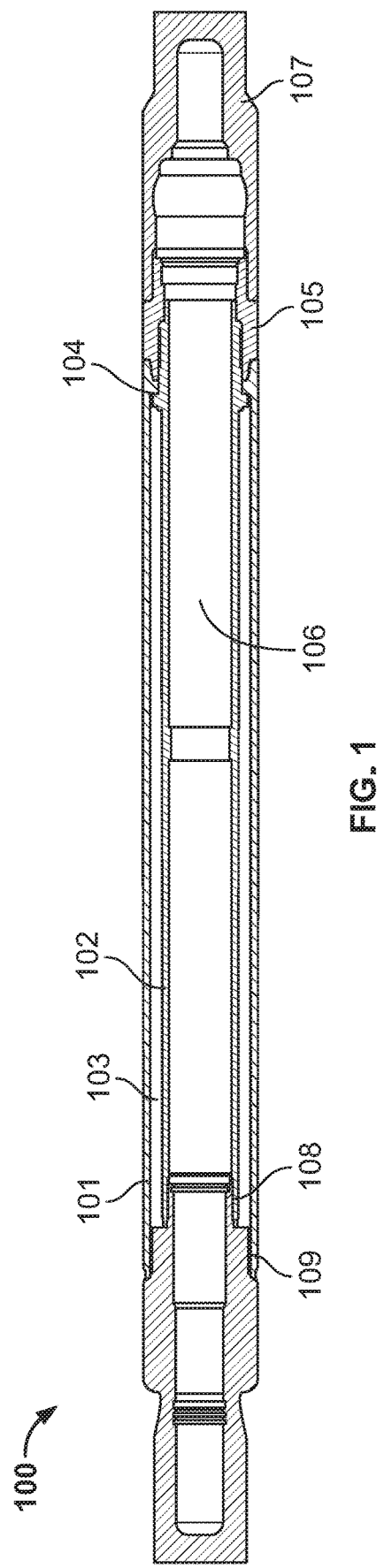
FIG. 1 depicts an example apparatus which leverages a threaded joint to connect two concentric tubes to a single tube.

FIG. 1 depicts an example apparatus which leverages a threaded joint to connect two concentric tubes to a single tube. A tube assembly 100 includes an inner tube 102 concentrically positioned within an outer tube 101. The inner diameter (ID) of the outer tube 101 is greater than the outer diameter (OD) of the inner tube 102 such that a chamber 103 is formed between the inner tube 102 OD and the outer tube 101 ID. The inner tube 102 and outer tube 101 maintain contact at a load shoulder 104 which forms the terminal end of the chamber 103 at the end of the tube assembly 100 onto which a threaded coupling 105 is threaded to form a threaded joint which joins the inner tube 102, outer tube 101, and the threaded coupling 105 (the "joint end"). The inner tube 102 is longer than the outer tube 101 at the joint end for receiving the threaded coupling 105. The threaded coupling 105 joins the inner tube 102 and the outer tube 101 to tubing 107. Threading the threaded coupling 105 onto the inner tube 102 engaged with the outer tube 101 and threading the tubing 107 onto the threaded coupling 105 joins the concentrically positioned inner tube 102 and outer tube 101 to the tubing 107. The threaded coupling 105 box and pin ends provide for a secure join between two concentrically positioned tubes and one tube.

The inner tube 102 can be longer than the outer tube 101. Applying preload to the outer tube 101 distributes tension and compression between the inner tube 102 and outer tube 101 as a result of the shorter length of the outer tube 101 relative to the inner tube 102. The inner tube 102 is first threaded onto an inner receiving thread 108 to enclose assembly interior 106 within the inner tube 102. The outer tube 101 is subsequently threaded onto an outer receiving thread 109 until the inner tube 102 and outer tube 101 are in contact at the load shoulder 104. Once the inner tube 102 and outer tube 101 shoulders are in contact at the load shoulder 104, the make-up of the threading between the outer tube 101 and outer receiving thread 109 may be incomplete, resulting in a gap. To close the gap, additional make-up torque is applied to the outer tube 101. Because the outer tube 101 is shorter than the inner tube 102 before threading the inner tube 102 and outer tube 101 onto the inner receiving thread 108 and the outer receiving thread 109, respectively, applying additional make-up torque to the outer tube 101 distributes tensile forces applied due to torqueing from the inner tube 102 to the outer tube 101. Preload is created in the outer tube 101 as a result of torqueing which "stretches" the outer tube 101 such that the threading makes up between the outer tube 101 and the outer receiving thread 109 and the gap is closed. Additionally, torqueing the outer tube 101 compresses the inner tube 102 as the contact at the load shoulder 104 is tightened. The compression applied to the inner tube 102 and tension applied to the outer tube 101 resulting from preloading are maintained when the threaded coupling 105 is threaded onto the inner tube 102 and engages with both the inner tube 102 and the outer tube 101. The shorter length of the outer tube 101 relative to the inner tube 102 in addition to the preload contributes to strengthening of the threaded joint formed by the outer tube 101, inner tube 102, and threaded coupling 105. For instance, once affected by tensile preload, the outer tube 101 can sustain a greater applied load relative to the inner tube 102 (e.g., when pulling the tube assembly 100 by the tubing 107). As a result. breakages of the inner tube 102 due to the applied load surpassing its maximum tolerated load prior to the applied load surpassing the maximum tolerated load of the outer tube 101 can be prevented. Similarly, the outer tube 101 can be longer than the inner tube 102. Preload may then be applied to the inner tube 102 such that tensile forces are distributed to the inner tube 102 and the outer tube 101 is compressed. Distribution of compression and tension can be controlled as a result of differing lengths of the inner tube 102 and the outer tube 101.

Figure 2:
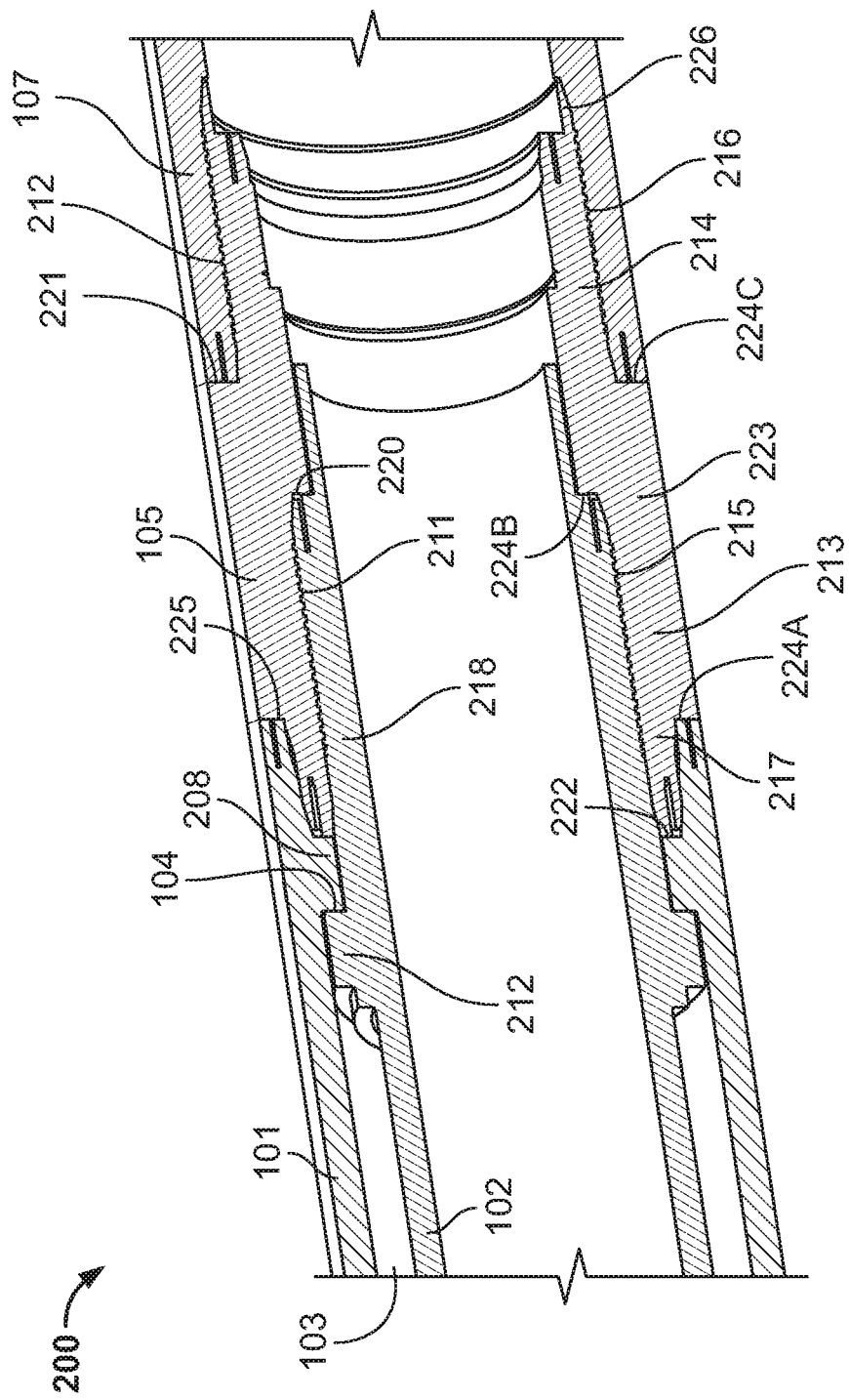
FIG. 2 depicts a longitudinal cross-section view of a threaded joint formed by a threaded coupling connecting two concentric tubes to a single tube.

FIG. 2 depicts a longitudinal cross-section view of a threaded joint formed by a threaded coupling connecting two concentric tubes to a single tube. FIG. 2 depicts a threaded joint 200 which has been formed by threading the threaded coupling 105 onto the inner tube 102. The tubing 107 is threaded onto the threaded coupling 105. The inner tube 102 and outer tube 101 are concentrically positioned to form the chamber 103 between the inner tube 102 OD and outer tube 101 ID as described with reference to FIG. 1. The load shoulder 104 is formed by an inwardly protruding shoulder 208 of the outer tube 101 ("outer tube shoulder 208") and an outwardly protruding shoulder 212 of the inner tube 102 ("inner tube shoulder 212"). The outer tube shoulder 208 and inner tube shoulder 212 maintain tight contact as a result of the preload applied to the outer tube 101 prior to threading the threaded coupling 105 onto the inner tube 102 to form the threaded joint 200. The inner tube 102 extends past the outer tube 101 with respect to the load shoulder 104 to form a pin end 218 of the inner tube 102 ("inner tube pin end 218").

The threaded coupling 105 includes a box end 213 and a pin end 214. The box end 213 contains internal threads 215 which are cut into the interior of the box end 213. The internal threads 215 of the box end 213 are threaded onto receiving threads 211 of the inner tube pin end 218 when making up the threaded joint 200. A box end lip 217 which lacks threading protrudes from the box end 213. The box end lip 217 includes a lip face 222 which maintains contact with the outer tube shoulder 208. The pin end 214 contains external threads 216 for receiving tubing internal threads 212 of the tubing 107. The pin end 214 terminates at a nose 226. Both the internal threads 215 and the external threads 216 of the respective ends of the threaded coupling 105 terminate at an unthreaded coupling shoulder 223. The coupling shoulder 223 includes coupling faces 224A-C. Faces of the inner tube 102, outer tube 101, and tubing 107 contact the coupling faces 224A-C as a result forming the threaded joint 200 and subsequently threading the tubing 107 onto the pin end 214. An outer tube face 225 of the outer tube 101 engages with the coupling face 224A. An inner tube face 220 of the inner tube pin end 218 engages with the coupling face 224B. A tubing face 221 of the tubing 107 engages with the coupling face 224C.

Figure 3:
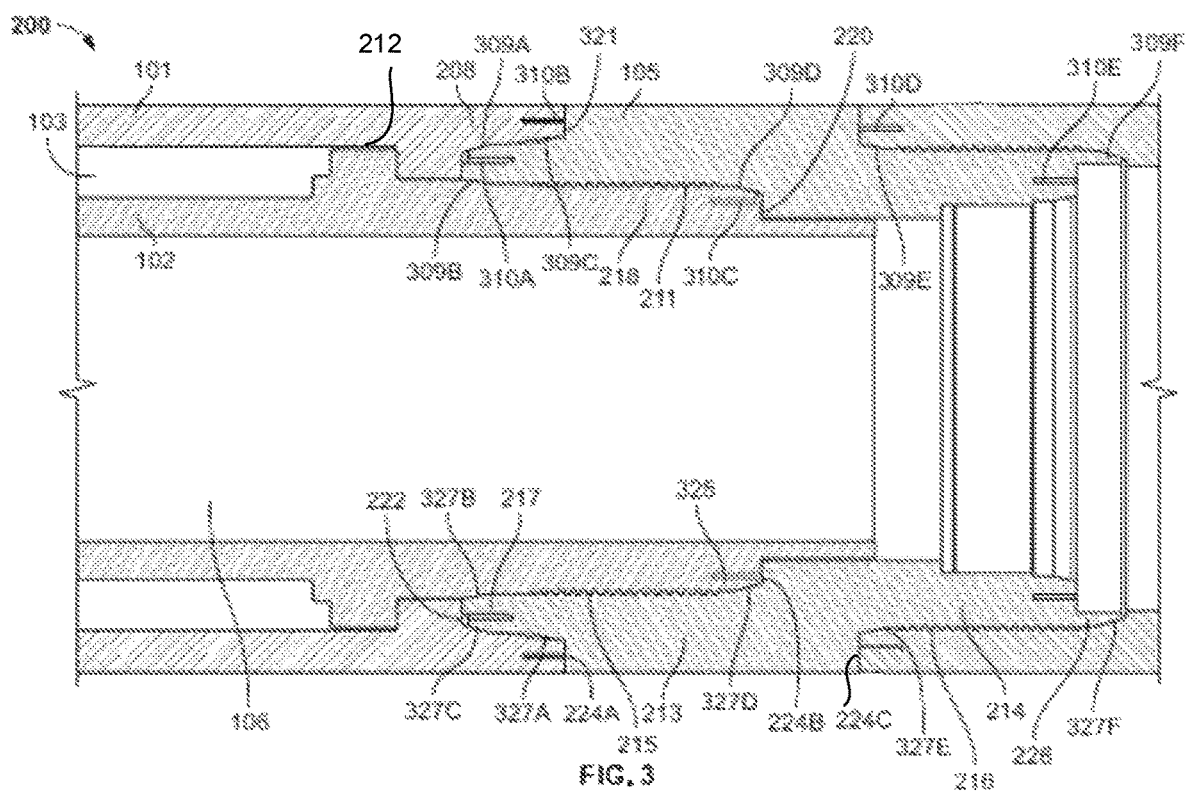
FIG. 3 depicts a longitudinal cross-section of a join between two concentric tubes and one tube which leverages a metal-to-metal scaling solution.

FIG. 3 depicts a longitudinal cross-section of a join between two concentric tubes and one tube which leverages a metal-to-metal scaling solution. The threaded joint 200 employs a metal-to-metal sealing solution for seals between the inner tube 102, outer tube 101, and threaded coupling 105. Similarly, the joint between the threaded coupling 105 and the tubing 107 employs a metal-to-metal sealing solution. After threading the box end 213 onto the inner tube pin end 218, thereby engaging the threaded coupling 105 with the inner tube 102 and outer tube 101 to form the threaded joint 200, four metal-to-metal seals 309A-D are formed between the threaded coupling 105 and the concentric tube assembly formed by the inner tube 102 and outer tube 101. Two metal-to-metal seals 309E-F are formed between the threaded coupling 105 and the tubing 107 by the threaded connection between the pin end 214 and the tubing 107. The metal-to-metal seals 309A-F ("seals 309A-F") are capable of withstanding high-temperature and high-pressure environments while preserving the structure of the assembly. For example, if the tubing 107 is downhole tubing and the tube assembly is deployed to a downhole environment, the seals 309A-F will not dissolve or otherwise fail as a result of exposure to the increasing temperatures and pressures of the environment. Further, some elastomeric or non-elastomeric sealing solutions may alter the structure of the components of the threaded joint 200 (e.g., by welding the inner tube 102 and the outer tube 101). As a result, the join between the inner tube 102, outer tube 101, and/or threaded coupling 105 cannot be disconnected without altering the construction of the components. The seals 309A-F are formed as a result of direct contact between sealing surfaces of the inner tube 102, outer tube 101, tubing 107, and threaded coupling 105 which are inherent to the structure of the tubes 101, 102, 107 and threaded coupling 105 rather than resulting from modifications and/or welded additions to the structure. As a result, the structures need not be altered to create the seals 309A-F, and the join between components of the threaded joint 200 can be removed by unthreading the tubing 107 and threaded coupling 105 from their respective receiving threads 216 and 211.

The seals 309A-F are formed by engagement of metal-to-metal sealing surfaces 327A-F ("sealing surfaces 327A-F") of the threaded coupling 105 with a respective sealing surface of the inner tube 102, outer tube 101, or tubing 107. The seals 309A-C are formed by the engagement of scaling surfaces 327A-C of the box end lip 217 with the inner tube 102 and outer tube 101 surfaces. The sealing surfaces 327B and 327C are adjacent to the lip face 222 on the box end lip 217 interior and box end lip 217 exterior, respectively. The sealing surface 327A is proximate to the sealing surface 327C on the box end lip 217 exterior. The seal 309B is formed by contact between the scaling surface 327B and an unthreaded portion of the inner tube pin end 218. The adjacent seals 309A and 309C are formed by the contact between the respective sealing surfaces 327C and 327A and the terminal portion of the outer tube 101 which continues past the outer tube shoulder 208. The seal 309D is formed due to contact between a nose 325 of the inner tube pin end 218 with the sealing surface 327D adjacent to the coupling face 224B of the threaded coupling 105. The seals 309E-F are formed by contact between sealing surfaces 327E-F of the pin end 214 and the tubing 107 threaded onto the threaded coupling 105. The seal 309E is formed at an unthreaded portion of the pin end 214 adjacent to the coupling face 224C by engagement of the tubing 107 with the face 224C and adjacent sealing surface 327E. The seal 309F is formed as a result of contact between the tubing 107 with the nose 219 of the pin end 214 and sealing surface 327F located on the nose 219.

Flexible seal components 310A-E correspond to at least one of each of the seals 309A-F. The flexible seal components 310A-E flex inwards and/or outwards in response to internal or external pressure. The flexible seal components 310A-E may be spring-energized metal seals concentrically positioned within ends of the inner tube pin end 218, outer tube 101, tubing 107 box end lip 217, and/or pin end 214. The threaded joint 200 exhibits three potential pressure points at the box end 213 due to the chamber 103 between the inner tube 102 and outer tube 101. The four seals 309A-D and a corresponding set of flexible seal components 310A-C respond to pressure exerted on the three pressure points at the box end 213. Similarly. two pressure points exist at the pin end 214 due to the join between the tubing 107 and the threaded coupling 105. Two seals 309E-F and corresponding flexible seal components 310D-E are located at the pin end 214 to handle pressure exerted on the two pressure points.

Pressure affecting the seals 309A-D and flexible seal components 310A-C of the threaded joint 200 may originate within the chamber 103, from the assembly interior 106, or outside of the outer tube 101. In response to pressure from the chamber 103, the flexible seal component 310A will either flex inwards towards the seal 309B (e.g., if the pressure is exerted towards the inner tube 102) or outwards towards the seal 309A (e.g., if the pressure is exerted towards the outer tube 101). Internal pressure causes the flexible seal component 310C to flex outwards towards the seal 309D. Similarly, external pressure outside of the outer tube 101 (e.g., annular pressure) causes the flexible seal component 310B to flex inwards towards the seal 309C. Flexing of the flexible seal components 310A-C towards the seals 309A-D forms a "barrier" to the applied pressure in response to pressure changes.

Pressure affecting the seals 309E-F and flexible seal components 310D-E of the join between the tubing 107 and the pin end 214 may originate within the assembly interior 106 or outside of the tubing 107 (e.g., annular pressure). Internal pressure causes the flexible seal component 310E to flex outwards towards the seal 309F. Similarly, external pressure originating outside of the tubing causes the flexible seal component 310D to flex inwards towards the seal 309E. Flexing of the flexible seal components 310D-E to form seals 309E-F forms a "barrier" to the applied pressure in response to pressure changes.

Figure 4:
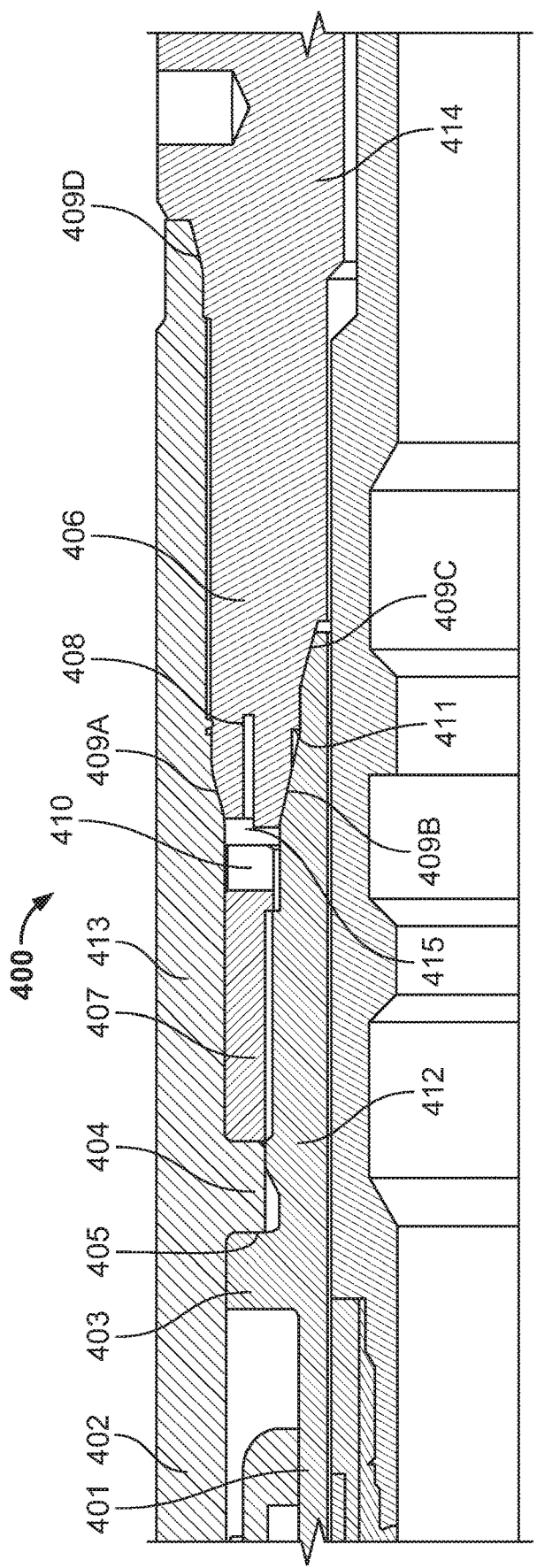
FIGS. 4 and 5 depict longitudinal cross-section views of a threaded joint formed by a threaded coupling connecting two concentric tubes of varying thicknesses to a single tube.
Figure 5:
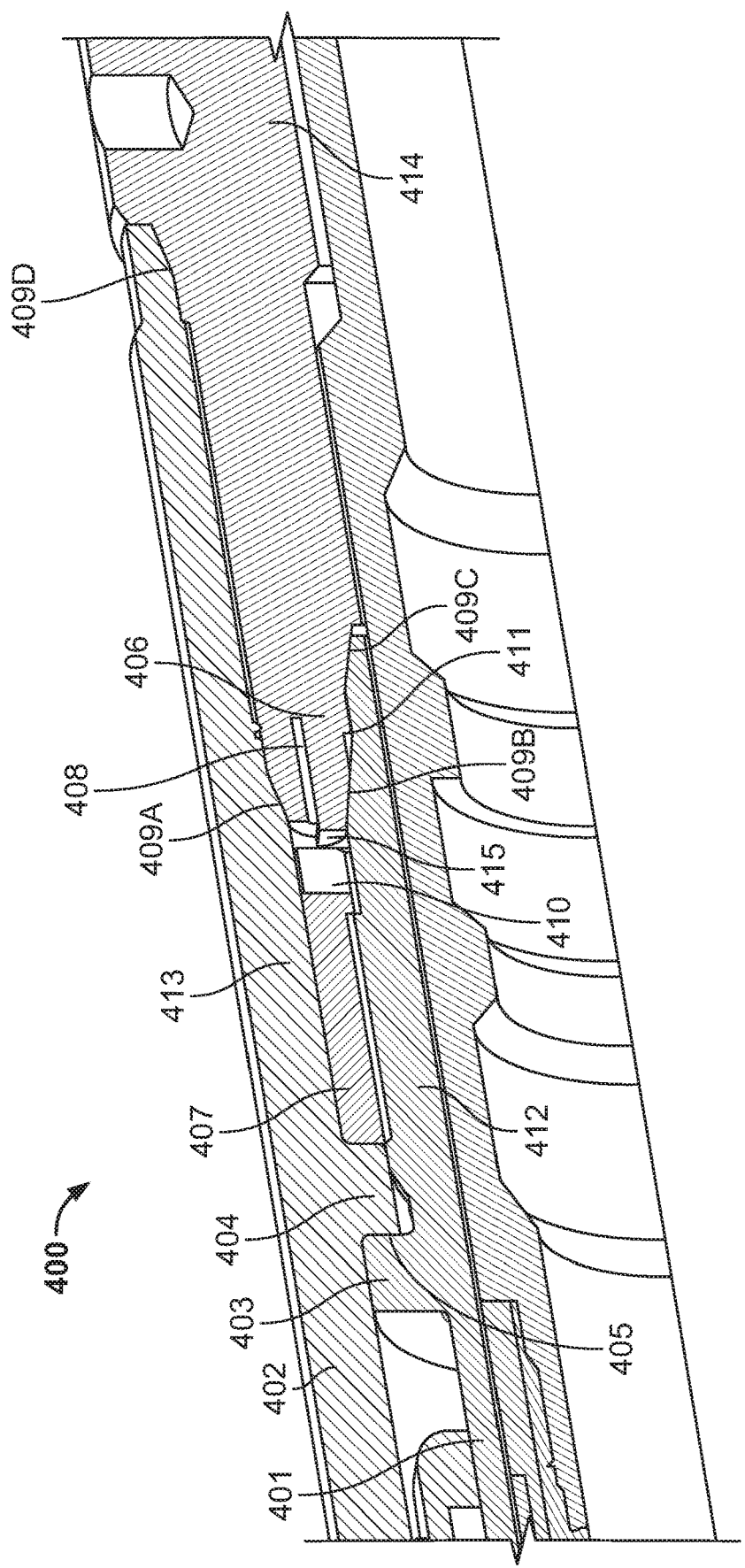

FIGS. 4 and 5 depict longitudinal cross-section views of a threaded joint formed by a threaded coupling connecting two concentric tubes of varying thicknesses to a single tube. A threaded joint 400 is formed by joining a threaded coupling 406 to an inner tube 401 and an outer tube 402 in which the inner tube 401 is concentrically positioned. The distance between the ID and OD of the outer tube 402 is greater than the distance between the ID and OD of the inner tube such that the outer tube 402 is of greater thickness than the inner tube 401. An inwardly protruding shoulder 404 of the outer tube 402 ("outer tube shoulder 404") and an outwardly protruding shoulder 403 of the inner tube 401 ("inner tube shoulder 403") maintain contact at a contact shoulder 405. The outer tube shoulder 404 may be shorter than the inner tube shoulder 403. Preload may be applied to the outer tube 402 as similarly described with reference to FIG. 1. An inner sleeve 412 of the inner tube 401 and an outer sleeve 413 of the outer tube 402 extend past the contact shoulder 305.

The distance between the OD of the inner sleeve 412 and the ID of the outer sleeve 413 may be restrictive as a result of the varying thicknesses of the inner tube 401 and outer tube 402. For instance, the threaded coupling 406 may be unable to contact the contact shoulder 405 due to the narrow region between the inner sleeve 412 and outer sleeve 413. To enforce the contact between the inner tube shoulder 403 and outer tube shoulder 404, a nut 407 can be leveraged. Placing the nut 407 between the inner sleeve 412 and the outer sleeve 413 forces the outer tube shoulder 404 against the inner tube shoulder 403 and ensures proper positioning of the threaded coupling 406 between the inner sleeve 412 and outer sleeve 413. Proper positioning of the threaded coupling facilitates correct formation of metal-to-metal seals 409A-D ("seals 409A-D") of the threaded joint 400. The nut 407 is tightly made up by an assembly tool 410 to force the nut 407 against the contact shoulder 405. For example, the assembly tool 410 may be a torque sleeve and a thread protector, where the torque sleeve facilitates threading the thread protector onto internal threads of the nut 407.

The threaded joint 400 can be formed by creating a threaded connection 411 between the threaded coupling 406 and the inner tube 401 and outer tube 402 once the nut 407 is made up with the assembly tool 410. The seals 409A-D are formed by engaging metal-to-metal sealing surfaces of the inner tube 401 and outer tube 402 with the threaded coupling 406 as similarly described with reference to FIGS. 2 and 3. The threaded coupling 406 may include flexible seal components which flex towards the seals 409A-D in response to pressure. For instance, FIGS. 4 and 5 depict a flexible seal component 408 adjacent to a face 415 of the threaded coupling 406. The flexible seal component 408 can flex inwards towards the seal 409B or outwards towards the seal 409A in response to pressure originating between the inner tube 401 and outer tube 402. A connecting tube (not pictured in FIGS. 4 and 5) may be secured to the concentric inner tube 401 and outer tube 402 via the threaded coupling 406 with a threaded connection between the connecting tube and a receiving end 314 of the threaded coupling 406. The receiving end 414 of the threaded coupling 406 provides for a similar connection between the threaded coupling 406 and the connecting tube as the connection between the threaded coupling (105 in FIGS. 1-3) and the tubing (107 in FIGS. 1-3) described with reference to FIGS. 1-3.

Variations

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components or structures described herein as a single instance. Finally, boundaries between various components are somewhat arbitrary. Other allocations of functionality are envisioned and may fall within the scope of the disclosure. In general, structures and functionality presented as separate components in the example configurations may be implemented as a combined structure or component. Similarly, structures presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

A threaded joint comprises a threaded coupling with a box end member. The box end member comprises a box end lip. The threaded joint comprises an outer tube with an internally protruding shoulder and an inner tube with an externally protruding shoulder. The inner tube is concentrically secured within the outer tube, and a terminal end of the inner tube comprises a pin end member. The pin end member is engaged with the box end member of the threaded coupling and the box end lip engages with the outer tube and the inner tube. The internally protruding shoulder and externally protruding shoulder are in contact a load shoulder. The pin end member of the inner tube extends past the load shoulder. A plurality of metal-to-metal seals are formed between metal-to-metal sealing surfaces of the threaded coupling, inner tube, and outer tube.

The threaded joint further comprises a plurality of flexible seal components. Each of the plurality of flexible seal components corresponds to at least one of the plurality of metal-to-metal seals.

The length of the inner tube differs from the length of the outer tube.

Preload tension is created in the outer tube and the inner tube is compressed.

Preload tension is created in the inner tube and the outer tube is compressed.

The outer tube is unthreaded.

Engagement of the box end lip with the outer tube and the inner tube forms a first, second, and third of the plurality of metal-to-metal seals.

A nose of the pin end member of the inner tube engages with an internal face of the threaded coupling to form a fourth of the plurality of metal-to-metal seals.

The outer tube is of a greater thickness than the inner tube.

The threaded joint further comprises a nut secured between the load shoulder and the threaded coupling.

A threaded coupling comprises a box end. The box end comprises internal threading positioned between a first lip and a first box end metal-to-metal sealing surface. The first lip comprises a first plurality of box end metal-to-metal sealing surfaces. A pin end comprises external threading positioned between a first pin end metal-to-metal sealing surface and a first nose. The first nose comprises a second pin end metal-to-metal sealing surface. A coupling shoulder has a first plurality of shoulder faces. The box end and the pin end protrude from the coupling shoulder.

The threaded coupling further comprises a first flexible seal component, where the first flexible seal component corresponds to at least one of the first plurality of box end metal-to-metal sealing surfaces.

The first flexible seal component is integrated into the first lip.

The threaded coupling further comprises a second flexible seal component, where the second flexible seal component corresponds to the second pin end metal-to-metal sealing surface.

A concentric tube assembly joined to a single tube comprises an inner tube engaged with an outer tube at a load shoulder. The load shoulder is formed by an inner tube shoulder adjacent to an outer tube shoulder. The inner tube comprises a first pin end with external threading. A threaded coupling comprises a first box end with internal threading and a second pin end with external threading. The first box end is threaded onto the first pin end to form a first threaded joint engaging the inner tube, outer tube, and threaded coupling. A second threaded joint is formed by threaded engagement of a second box end of the single tube with the second pin end.

The first threaded joint comprises a first plurality of metal-to-metal seals.

The concentric tube assembly joined to the single tube further comprises a first plurality of flexible seal components. Each of the first plurality of flexible seal components corresponds to at least one of the first plurality of metal-to-metal seals.

The second threaded joint comprises a second plurality of metal-to-metal seals.

The concentric tube assembly joined to the single tube further comprises a second plurality of flexible seal components. Each of the second plurality of flexible seal components corresponds to at least one of the second plurality of metal-to-metal seals.

The concentric tube assembly joined to the single tube further comprises applying preload to the outer tube, where the outer tube is shorter than the inner tube.

What is claimed is:

1. A threaded joint comprising:
    a threaded coupling with a box end member, wherein the box end member comprises a box end lip;
    an outer tube with an internally protruding shoulder;
    an inner tube with an externally protruding shoulder, wherein the inner tube is concentrically secured within the outer tube and a terminal end of the inner tube comprises a pin end member, wherein the pin end member is engaged with the box end member of the threaded coupling and the box end lip engages with the outer tube and the inner tube;
    a load shoulder at which the internally protruding shoulder and externally protruding shoulder are in contact, wherein the pin end member of the inner tube extends past the load shoulder; and
    a plurality of metal-to-metal seals formed between metal-to-metal sealing surfaces of the threaded coupling, inner tube, and outer tube.

2. The threaded joint of claim 1 further comprising a plurality of flexible seal components, wherein each of the plurality of flexible seal components corresponds to at least one of the plurality of metal-to-metal seals.

3. The threaded joint of claim 1, wherein a length of the inner tube differs from the length of the outer tube.

4. The threaded joint of claim 3, wherein preload tension is created in the outer tube and the inner tube is compressed.

5. The threaded joint of claim 3, wherein preload tension is created in the inner tube and the outer tube is compressed.

6. The threaded joint of claim 1, wherein the outer tube is unthreaded.

7. The threaded joint of claim 1, wherein engagement of the box end lip with the outer tube and the inner tube forms a first, second, and third of the plurality of metal-to-metal seals.

8. The threaded joint of claim 1, wherein a nose of the pin end member of the inner tube engages with an internal face of the threaded coupling to form a fourth of the plurality of metal-to-metal seals.

9. The threaded joint of claim 1, wherein the outer tube is of a greater thickness than the inner tube.

10. The threaded joint of claim 9 further comprising a nut secured between the load shoulder and the threaded coupling.

11. A threaded coupling configured to couple an inner tube concentrically inside an outer tube to a downhole tubing, the threaded coupling comprising:
 a box end, wherein the box end comprises internal threading configured to threadedly couple with external threading of the inner tube, the internal threading of the box end positioned between a first lip and a first box end metal-to-metal sealing surface, wherein the first lip is configured to couple with the outer tube, and wherein the first lip includes a first plurality of box end metal-to-metal sealing surfaces;
 a pin end, wherein the pin end is configured to threadedly couple with internal threading of the downhole tubing, and wherein the pin end includes external threading positioned between a first pin end metal-to-metal sealing surface and a first nose, and wherein the first nose comprises a second pin end metal-to-metal sealing surface; and
 a coupling shoulder with a first plurality of shoulder faces, wherein the box end and the pin end protrude from the coupling shoulder.

12. The threaded coupling of claim 11 further comprising a first flexible seal component, wherein the first flexible seal component corresponds to at least one of the first plurality of box end metal-to-metal sealing surfaces.

13. The threaded coupling of claim 12, wherein the first flexible seal component is integrated into the first lip.

14. The threaded coupling of claim 11 further comprising a second flexible seal component, wherein the second flexible seal component corresponds to the second pin end metal-to-metal sealing surface.

15. A concentric tube assembly joined to a single tube comprising:
 an outer tube including an inwardly protruding first shoulder;
 an inner tube concentrically inside the outer tube, the inner tube including an outwardly protruding second shoulder engaged with the first shoulder to form a load shoulder, and wherein the inner tube comprises a first pin end with external threading;
 a threaded coupling comprising a first box end with internal threading and a second pin end with external threading, wherein the first box end is threaded onto the first pin end to form a first threaded joint engaging the inner tube, outer tube, and threaded coupling; and
 a second threaded joint formed by threaded engagement of a second box end of the single tube with the second pin end.

16. The concentric tube assembly joined to the single tube of claim 15, wherein the first threaded joint comprises a first plurality of metal-to-metal seals.

17. The concentric tube assembly joined to the single tube of claim 16 further comprising a first plurality of flexible seal components, wherein each of the first plurality of flexible seal components corresponds to at least one of the first plurality of metal-to-metal seals.

18. The concentric tube assembly joined to the single tube of claim 15, wherein the second threaded joint comprises a second plurality of metal-to-metal seals.

19. The concentric tube assembly joined to the single tube of claim 18 further comprising a second plurality of flexible seal components, wherein each of the second plurality of flexible seal components corresponds to at least one of the second plurality of metal-to-metal seals.

20. The concentric tube assembly joined to the single tube of claim 15, wherein the outer tube is shorter than the inner tube.

* * * * *